United States Patent
Ben-Yosef et al.

(10) Patent No.: US 11,902,312 B2
(45) Date of Patent: Feb. 13, 2024

(54) SECURITY THREATS FROM LATERAL MOVEMENTS AND MITIGATION THEREOF

(71) Applicant: Cymulate Ltd., Rishon Lezion (IL)

(72) Inventors: Avihai Ben-Yosef, Tel Aviv (IL); Shmuel Ur, Shorashim (IL)

(73) Assignee: CYMULATE LTD., Rishon Lezion (IL)

( * ) Notice: Subject to any disclaimer, the term of this patent is extended or adjusted under 35 U.S.C. 154(b) by 737 days.

(21) Appl. No.: 16/671,631

(22) Filed: Nov. 1, 2019

(65) Prior Publication Data

US 2021/0136101 A1 May 6, 2021

(51) Int. Cl.
*H04L 29/06* (2006.01)
*H04L 9/40* (2022.01)

(52) U.S. Cl.
CPC .......... *H04L 63/1433* (2013.01); *H04L 63/20* (2013.01)

(58) Field of Classification Search
CPC ............................ H04L 63/1433; H04L 63/20
See application file for complete search history.

(56) References Cited

U.S. PATENT DOCUMENTS

| | | | | |
|---|---|---|---|---|
| 2005/0193430 A1* | 9/2005 | Cohen | ................ | H04L 63/1433 726/25 |
| 2009/0307777 A1* | 12/2009 | He | .......................... | G06F 21/55 726/25 |
| 2010/0058456 A1* | 3/2010 | Jajodia | .................. | G06F 21/552 726/11 |
| 2018/0103052 A1* | 4/2018 | Choudhury | ............. | H04L 63/20 |
| 2019/0222597 A1* | 7/2019 | Crabtree | ............. | H04L 63/1433 |
| 2020/0177618 A1* | 6/2020 | Hassanzadeh | ........ | G06F 21/552 |
| 2020/0280577 A1* | 9/2020 | Segal | ...................... | H04L 63/20 |

* cited by examiner

*Primary Examiner* — Noura Zoubair
(74) *Attorney, Agent, or Firm* — Tutunjian & Bitetto, B.C.

(57) ABSTRACT

A method, apparatus and product for assessing security threats from lateral movements and mitigation thereof. The method comprising statically analyzing the network to determine for each asset of a list of assets in a network, potential network lateral movements therefrom to other assets; dynamically analyzing the network to validate each potential network lateral movement identified by the static analysis; generating a graph of network lateral movements, wherein the graph comprises nodes and directed edges, wherein a node of the graph represents an asset of the list of assets, wherein a direct edge of the graph connecting a source node to a target node represents a validated network lateral movement from a source asset, represented by the source node, to a target asset, represented by the target node; and utilizing the graph of network lateral movements to assess security risk to the network.

19 Claims, 5 Drawing Sheets

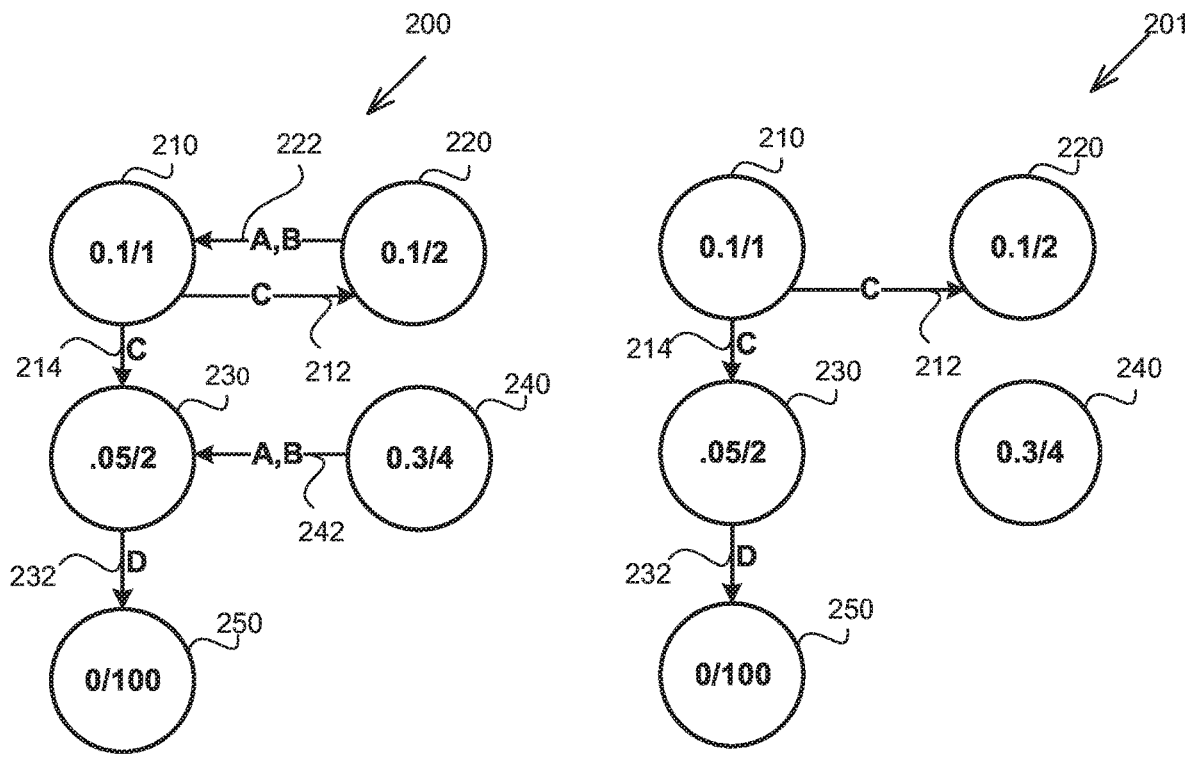
FIG. 2A
FIG. 2B
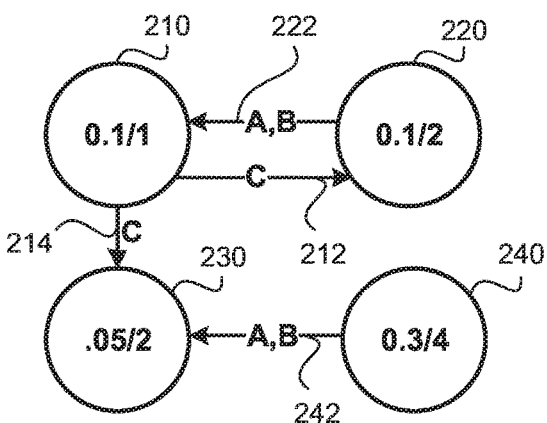
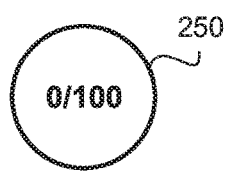
FIG. 2C

SECURITY THREATS FROM LATERAL MOVEMENTS AND MITIGATION THEREOF

TECHNICAL FIELD

The present disclosure relates to cybersecurity in general, and to cybersecurity of networks, in particular.

BACKGROUND

Network Lateral movement is a technique used by hackers and other malicious users to systematically move through a network. This technique is often used to identify, gain access to and exfiltrate sensitive data. Once an attacker penetrates into a network, the attack may use different techniques to gain higher privileges and access, allowing her to move laterally through the network. Based on the access she gained to one asset, the attacker gains access to different assets in what is considered a "sideway" movement, moving between devices and apps. This is performed to map the system, identify targets and eventually obtain a valuable payload.

In some cases, if the attacker is able to secure administrative privileges, malicious lateral movement activities can be extremely difficult to detect, and it may appear as normal network traffic.

BRIEF SUMMARY

One exemplary embodiment of the disclosed subject matter is a method comprising: obtaining a list of assets of a network; statically analyzing the network to determine for each asset of the list of assets, potential network lateral movements therefrom to other assets; dynamically analyzing the network to validate each potential network lateral movement identified by the static analysis, wherein the potential network lateral movements is validated based on a successful lateral movement during the dynamic analysis; generating a graph of network lateral movements, wherein the graph comprises nodes and directed edges, wherein a node of the graph represents an asset of the list of assets, wherein a direct edge of the graph connecting a source node to a target node represents a validated network lateral movement from a source asset, represented by the source node, to a target asset, represented by the target node; and utilizing the graph of network lateral movements to assess security risk to the network.

Optionally, said dynamically analyzing the network comprises performing penetration testing.

Optionally, said obtaining a list of assets comprises: analyzing the network to determine the list of assets in the network; and determining properties of assets in the network, wherein the properties comprise at least one of: a list of opened ports; a list of executed services; and indication regarding utilization of one or more protection mechanisms.

Optionally, said statically analyzing comprises determining for each asset of the list of assets, whether the asset is susceptible to one or more methods enabling network lateral movements, wherein the one or more methods comprise at least one of: a Pass the Hash (PtH) technique; a Pass the Ticket (PtT) technique; a modification of a logon script; a Remote Desktop Protocol (RDP) attack; and a Server Message Block (SMB) relay attack.

Optionally, said generating comprises: assigning, for each node in the graph of network lateral movements, a probability of penetration to an asset corresponding the each node; assigning for each node in the graph of network lateral movements, a payload utility representing utility from penetration to an asset corresponding the each node; and labeling each edge in the graph of network lateral movements with one or more labels indicating methods for performing network lateral movement from a source asset of the each edge to a target asset of the each edge.

Optionally, said utilizing comprises: displaying a visualization of the graph of network lateral movements; determining a modified graph, wherein the modified graph is determined based on a modification of the graph in view of a mitigation action, wherein the mitigation action removes at least one edge from the graph; and displaying a visualization based on the modified graph.

Optionally, said utilizing comprises: computing a utility of a mitigation action, wherein the utility is computed based on a reduction in an estimated loss from penetration, wherein the estimated loss from penetration is computed based on the graph of network lateral movements.

Optionally, the estimated loss from penetration is computed as a summation of estimated loss from penetration to each node of the graph, wherein an estimated loss from penetration to a node is computed based on probability of penetration directly to the node and based on payload utility of nodes that are reachable from the node.

Optionally, the estimated loss from penetration to the node is further computed based on a probability of successful network lateral movement from the node to the nodes that are reachable from the node.

Optionally, the utility is computed based on the reduction in the estimated loss from penetration, based on an estimated cost of applying the mitigation action, and based on a decrease in usability caused by the mitigation action; wherein the utility is a monotonically increasing function with respect to the reduction in the estimated loss from penetration; wherein the utility is a monotonically decreasing function with respect to the estimated cost of applying the mitigation action; and wherein the utility is a monotonically decreasing function with respect to the decrease in usability caused by the mitigation action.

Optionally, said utilizing comprises: identifying a bridge in the graph of network lateral movements; and providing a suggested mitigation action that is configured to remove the bridge from the graph of network lateral movements.

Another exemplary embodiment of the disclosed subject matter is a non-transitory computer readable medium retaining program instructions, which program instructions when read by a processor, cause the processor to perform: obtaining a list of assets of a network; statically analyzing the network to determine for each asset of the list of assets, potential network lateral movements therefrom to other assets; dynamically analyzing the network to validate each potential network lateral movement identified by the static analysis, wherein the potential network lateral movements is validated based on a successful lateral movement during the dynamic analysis; generating a graph of network lateral movements, wherein the graph comprises nodes and directed edges, wherein a node of the graph represents an asset of the list of assets, wherein a direct edge of the graph connecting a source node to a target node represents a validated network lateral movement from a source asset, represented by the source node, to a target asset, represented by the target node; and utilizing the graph of network lateral movements to assess security risk to the network.

Yet another exemplary embodiment of the disclosed subject matter is an apparatus comprising a processor and a memory unit, wherein said processor is configured to perform: obtaining a list of assets of a network; statically analyzing the network to determine for each asset of the list of assets, potential network lateral movements therefrom to other assets; dynamically analyzing the network to validate each potential network lateral movement identified by the static analysis, wherein the potential network lateral movements is validated based on a successful lateral movement during the dynamic analysis; generating a graph of network lateral movements, wherein the graph comprises nodes and directed edges, wherein a node of the graph represents an asset of the list of assets, wherein a direct edge of the graph connecting a source node to a target node represents a validated network lateral movement from a source asset, represented by the source node, to a target asset, represented by the target node; and utilizing the graph of network lateral movements to assess security risk to the network.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIGS. 2A-2C show illustrations of graph of network lateral movements, in accordance with some exemplary embodiments of the disclosed subject matter.

DETAILED DESCRIPTION

Figure 1A:
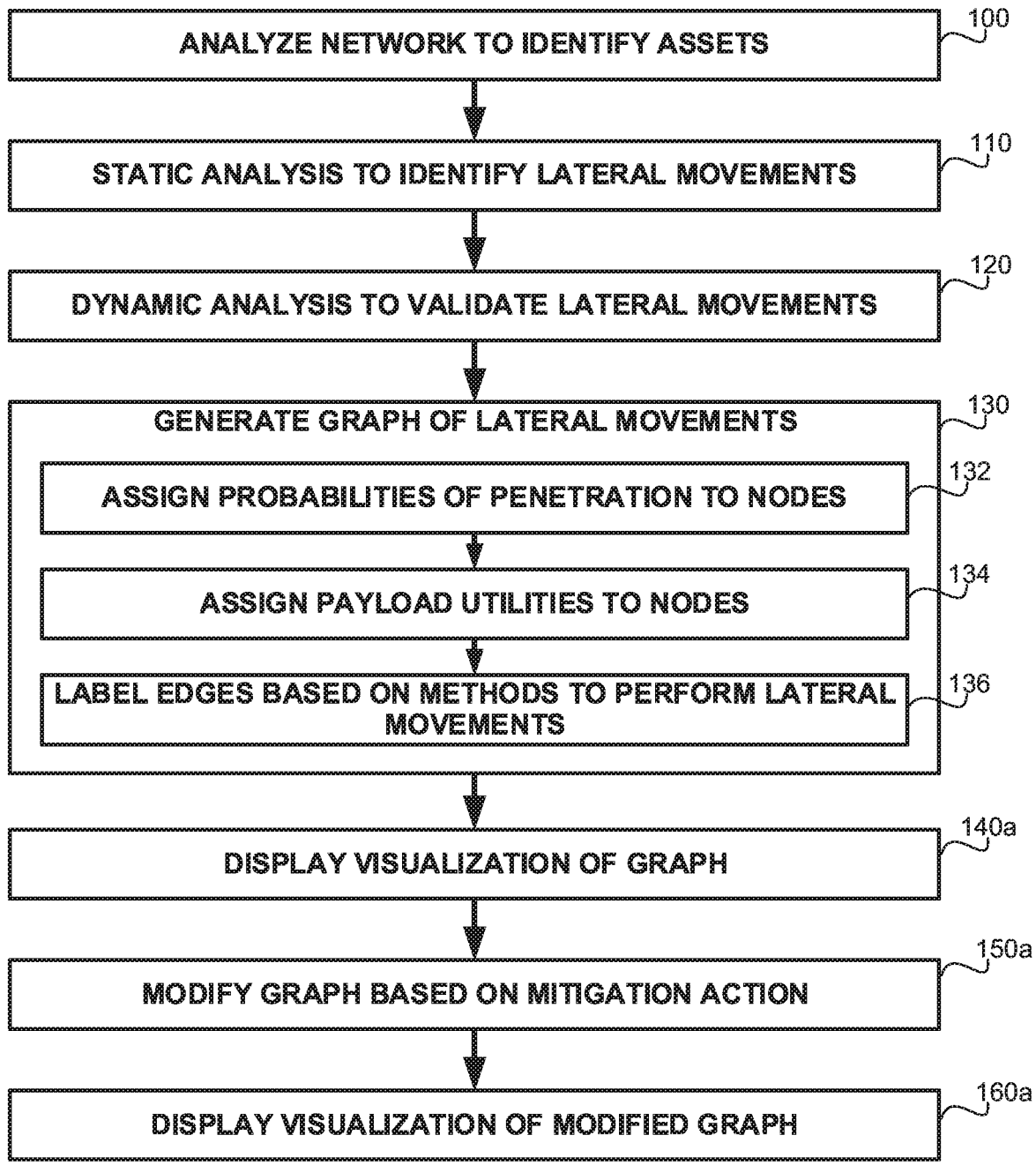
FIG. 1A-1C show flowchart diagrams of methods, in accordance with some exemplary embodiments of the disclosed subject matter.

One technical problem dealt with by the disclosed subject matter is to provide a means to identify and analyze security threats from network lateral movements. In some cases, network lateral movements may pose a serious security threat to an organization, as a single susceptible asset may expose congenital information in assets that can be reached from the penetrated asset, and in some cases even the entire network.

Another technical problem dealt with by the disclosed subject matter is to provide for an automated manner for suggesting a mitigation action to improve security of the network. In some cases, it may be desired to evaluate whether a potential mitigation action provides a benefit or not. In some cases, a mitigation action may be performed without providing positive utility. As an example, the mitigation action may not prevent any penetration scenario. Additionally, or alternatively, the mitigation action may prevent penetration scenarios that relate to low-priority assets having insignificant payloads. Additionally, or alternatively, the mitigation action may require a substantial resource investment in order to be applied. Additionally, or alternatively, the mitigation action may reduce usability of the network, as it may create obstacles that interfere with legitimate activities of non-malicious users.

One technical solution is to generate a graph of network lateral movements for a network. The network may be analyzed to identify assets therein. Static analysis of the network may be performed to determine, for each asset, potential network lateral movements. Static Analysis may provide an over-approximation of the network lateral movements in the network, as it may identify all network lateral movements and some invalid network lateral movements that cannot be utilized. In some exemplary embodiments, dynamic analysis may be performed on the network. The dynamic analysis may comprise performing penetration testing, attempting to exploit each potential network lateral movement identified by the static analysis. In some exemplary embodiments, a subset of the potential network lateral movements may be validated based on a successful lateral movement during the dynamic analysis. Remaining potential network lateral movements may be invalidated based on penetration testing being unable to perform the network lateral movement. The graph of network lateral movements may be generated to represent the assets and validated network lateral movements therebetween. The graph may be utilized to assess security risk to the network.

It is noted that static analysis may provide incomplete information. Lateral movement may appear possible, during static analysis, but may be prevented in ways that are not examined in the static phase or even cannot be examined. For example, local credentials may be deployed and may appear to the static analysis as a vulnerability. In actuality, configurations in remote machines may deny connections using the local credentials. The rejection of the local credentials may be discovered by penetration testing attempting to utilize them in a lateral movement.

In some exemplary embodiments, penetration testing may be focused on places where there is a potentially significant impact. In some cases, based on information obtained prior to the dynamic analysis, significant assets and network lateral movements may be identified. In some cases, a significant network lateral movement may be a lateral movement that may provide access to high-utility payloads from a fairly easy to penetrate asset. In some cases, the utility payloads may be determined automatically or provided manually by a user, Additionally, or alternatively, probability of penetration to an asset may be provided by a user or determined automatically. In some cases, the probability of being penetrated may be based on the vulnerability of the asset. In some cases, some users may be targeted more often and assets associated therewith may have a high risk of being attacked. As another example, some users may work in hostile environments and therefore may be attacked more often. As yet another example, different devices may be protected by different measures, which may affect their susceptibility to penetration.

In some exemplary embodiments, a list of assets in the network may be compiled. In some exemplary embodiments, static mapping of the organization may be performed. The assets and connectivity therebetween may be mapped. Additionally or alternatively, each asset may be checked in a static manner individually. In some exemplary embodiments, for each asset, relevant properties may be determined automatically or obtained from a user. The properties may include, for example, a list of opened ports. In some cases, specific ports may be of interest, such as ports that are used for attacks (e.g., port 445, 135, 3389, or the like). In some exemplary embodiments, the properties may include a list of executed services that may be executed by the asset. In some cases, specific executed services may be of interest, such as services that can be relied upon for attacks (e.g., Server Message Block (SMB), Windows Management Instrumentation (WMI), Distributed Component Object Model (DCOM), Remote Desktop Protocol (RDP), Secure Shell (SSH) or the like). In some exemplary embodiments, the properties may include indications regarding the usage of protection mechanisms. For example, it may be determined whether an anti-Man-In-The-Middle (MITM) mechanism, such as SMB signaling is enabled or not.

In some exemplary embodiments, static analysis may be employed to determine whether certain methods or exploits may be used to perform network lateral movements from an asset to another asset. The methods may include, for example, Pass the Hash (PtH) technique, Pass the Ticket (PtT) technique, a modification of a logon script, a Remote Desktop Protocol (RDP) attack, a Server Message Block (SMB) relay attack, or the like.

In some exemplary embodiments, the graph of network lateral movements may be an organization lateral movement map that shows vulnerability. The graph may be displayed in a visual manner to the user, showing potential vulnerabilities, indicating possible lateral movements in the network, and the like. In some exemplary embodiments, the visualization may show the graph and indicate where one can get from one place to another. In some cases, connected components of the graph may be displayed as a single element, and bridges connecting therebetween may be displayed. The user may perform drill down to obtain a detailed view of a connected component. In some exemplary embodiments, color-coding of the nodes of the graph may be utilized such as to indicate which assets are currently vulnerable, and which are not. Vulnerability may be determined based on a probability of penetrating directly to the node or indirectly via other nodes and network lateral movements therefrom. As an example, a node having a probability above a high threshold may be presented in red, a node having a probability below the high threshold but above a low threshold may be presented in yellow, and a node having a probability below the low threshold may be presented in green. Additionally or alternatively, color-coding may be utilized to indicate whether care should be taken with respect to the node. In some cases, a node that has a probability of penetration above a high threshold and whose payload value is above a threshold may be color-coded in red. A node whose payload value is below the threshold may be color coded in green regardless of the penetration probability thereof. A node whose payload value is above the threshold, and whose probability of penetration is above a low threshold and below the high threshold, may be displayed in yellow. In some exemplary embodiments, any node having an estimated loss from penetration above a high threshold may be color coded in red, any node having an estimated loss from penetration in between a low threshold and a high threshold may be colored in yellow, and any node having an estimated loss from penetration below the low threshold may be colored in green. Estimated loss from penetration may be a computed based on payload value of the reachable nodes that can be reached therefrom via network lateral movements, and based on the probabilities to penetrate the node and to reach other nodes after penetrating it. It is noted that the disclosed subject matter is not limited to the above examples and other color-codings may be applied in accordance with the disclosed subject matter.

In some exemplary embodiments, edges between nodes may be annotated, such as using labels or colors, based on techniques that can be employed to traverse the edge in a network lateral movement.

In some exemplary embodiments, a probability of penetration to an asset may be determined. A node representing the asset may be annotated, such as using labels or colors, accordingly.

Additionally or alternatively, payload utility may be determined for each node. The payload utility may indicate the utility to the attacker from reaching the payload of the asset. Additionally or alternatively, the payload utility may indicate to disadvantage to the network owner from the penetration to the payload. In some exemplary embodiments, confidential information may be associated with a relatively high payload utility, indicating that such payload should be protected. A node representing an asset may be annotated, such as using labels, colors, or the like, to indicate the payload value.

In some exemplary embodiments, a visualization of the graph may be displayed, and the user may select an edge to remove therefrom. The edge may be removed after a mitigation action is performed to disable the ability to perform a network lateral movement according thereto. In some exemplary embodiments, there may be multiple methods that can be employed to traverse an edge. The mitigation action may disable one method, and cause a change in the annotation, or disable all methods, and cause the edge to be removed.

In some exemplary embodiments, a visualization of a modified graph may be displayed to a user, indicating the estimated state after a mitigation action is implemented. The modified graph may remove one or more edges from the graph. In some cases, a visual indication may be utilized to show the user which edges are removed. Additionally, or alternatively, other visualizations showing the differences may be utilized. In some cases, two visualizations may be displayed one next to the other, to allow the user to identify the differences therebetween.

In some exemplary embodiments, an estimated loss from penetration function may be defined. The value of the estimated loss from penetration function may be computed based on the graph of network lateral movements. The estimated loss from penetration function may be utilized as a part of a target function in optimizations regarding security risk from network lateral movements. In some exemplary embodiments, the estimated loss from penetration (ELP) function may be computed as a follows: $ELP(G) = \Sigma_{V_n} ELP(G,n)$, where G is the graph of network lateral movements that comprise assets and indicative reachability via network lateral movements therebetween, n is an asset in G, and $ELP(G,n)$ is the estimated loss from penetration to n, which may be computed as $ELP(G,n) = p(n) \cdot \Sigma_{m \in Reach(n)} pl(m)$. In some exemplary embodiments, p(n) is penetration probability to the asset n, pl(m) is the payload utility of asset m, and Reach(n) is the set of assets that are reachable in G from n (including n itself). Additionally or alternatively, ELP of a node may be computed while taking into consideration that there are different probabilities of successful network lateral movements to each asset. ELP may be computed as $ELP(G,n) = p(n) \cdot \Sigma_{m \in Reach(n)} pl(m) \cdot pr(n,m)$, where pr(n,m) is the probability of successful network lateral movement from n to m. In some exemplary embodiments, there may be different probabilities that an attacker can perform a specific network lateral movement. In some exemplary embodiments, the probabilities may be defined per attacker, such that all network lateral movements are of the same probability. Additionally or alternatively, there may be different probabilities to the same type of lateral movement method in different edges. In some cases, going through multiple. In some exemplary embodiments, successfully reaching an asset may not necessarily mean that the payload of the asset is compromised. The pr(n,m) function may also take into account the probability of the payload of the asset m to be exploited.

In some exemplary embodiments, estimated loss from penetration may be utilized as a quantitative measure that can be used to determine whether to perform a mitigation action. In some cases, if the estimated loss from penetration is not reduced by a mitigation action, such action should not be performed. In some cases, two different mitigation actions may yield a same outcome and therefore may be interchangeable.

In some exemplary embodiments, a utility function of a mitigation action may be computed based on the graph of network lateral movements. The utility function of a mitigation action act may be defined as $U(G,act)=ELP(G)-ELP(APP(G,act))$, where U is the utility function of the action act in view of graph G, $ELP(G)$ is the estimated loss from penetration of a graph G, $APP(G,act)$ is the modified graph that is obtained after the mitigation action act is applied in G. Hence, the utility function may be computed based on a reduction in the estimated loss from penetration due to the mitigation action, also denoted as $RELP(G,act)$.

In some exemplary embodiments, the utility function of a mitigation action may be computed based on the downsides and costs associated with applying the mitigation action. In some cases, there may be cost of applying a mitigation action. Such cost may be associated with resources that are invested in the application and implementation of the mitigation action. Additionally or alternatively, the application of the mitigation action to users may cause an inconvenience to legitimate users, which may reduce usability of the network. In some cases, the network may be analyzed to determine the reduction in usability. For example, logs may be obtained and analyzed to determine whether the potential inconvenience would reduce actual usability of the network. In some cases, the mitigation action may prevent a legitimate user from autonomously performing an action, such as due to requiring higher-level permission, and would require that she request assistance from an administrator. If such action is common, the mitigation action adversely affect the usability in a substantial manner. If, on the other hand, the action is rare, the effect on usability may be limited. In some exemplary embodiments, the utility function may be computed as $U(G,act)=RELP(G,act)-C(act)-RU(act)$, where $C(act)$ is the cost of applying the mitigation action act and $RU(act)$ is the reduction in usability due to the mitigation action act. In some cases, the values of each function RELP, C, and RU may be normalized to a same scale, weighted, or the like.

In some exemplary embodiments, a mapping between mitigation actions and methods of performing network lateral movements may be determined, manually, automatically, or in combination thereof. In some exemplary embodiments, for each mitigation action, methods or exploits it prevents may be listed, so as to allow identification of edges that can be removed when such action is implemented. Additionally or alternatively, the cost of applying the mitigation may be provided for the mitigation action. Additionally or alternatively, the reduction in usability in view of mitigation action may also be included in the mapping. As an example, one mitigation action may be to change a weak password of a user having high-level privileges. Such mitigation action may be useful against various techniques such as guessing password, utilizing a password cracking tool and brute force password enumeration. The cost of applying the mitigation action may include the resources that are invested in the user having to take a short action, which is estimated to take about a minute. The reduction in usability may be associated with the user having to remember a harder password. A non-limiting exemplary table exemplifying a mapping is shown below. It is noted that in some cases organizational users may not be adversely affected depending on the quality of the solution implemented by the IT department. However, even in such cases, the IT staff may experience reduction in usability.

| Mitigation action | Method or exploits | Cost | Reduction in usability |
|---|---|---|---|
| Remove <strong user> from Service Principle Name (SPN) on the domain controller | Kerberoasting | 1 week of IT work | Affects IT: Create a user dedicated for the service with limited permissions |
| Change weak password of a user, Set account lockout policies after a certain number of failed login attempts. | guessing password; utilizing a password cracking tool; brute force password enumeration password spraying | 5 minutes of user work to reset password 1 hour of IT work to configure the policy | Affects Users: Passwords are harder to remember. Users occasionally get locked-out and require IT assistance. A denial of service condition may occasionally occur, rendering environments unusable. |
| Create a registry key to deny credential dumping. Do not put user or admin domain accounts in the local administrator groups across systems unless they are tightly controlled, as this is often equivalent to having a local administrator account with the same password on all systems. Follow best practices for design and administration of an enterprise network to limit privileged account use across administrative tiers. Consider disabling or restricting New Technology LAN Manager (NTLM) | Credential Dumping | Depending on complexity: either 1 hour of IT work or several days of development work | Affects IT: Old software's might use old authentication protocols so updating them to restrict the usage of old ways to authenticate and pass/save credentials; Affects users: users may be limited by the software they can use. |

-continued

| Mitigation action | Method or exploits | Cost | Reduction in usability |
|---|---|---|---|
| Do not use the same password for the built-in local administrators. Do not allow a domain user to be in the local administrator group on multiple systems. Apply patch KB2871997 to Windows 7 and higher systems to limit the default access of accounts in the local administrator group. | Pass the Hash (Domain/Local) | 1 week of IT work | Affects IT: IT will need to deploy the change of the Local Administrator Password on all of the machines in the network. Affects Users: in some cases, the users may not be supported efficiently by the IT Support. |
| Need to implement a solution to manage local built-in administrator password for IT/support team usage | | 2 weeks of IT and development work There may be costs to ensure the solution is secure. It may be required to purchase additional hardware or software. | Affects IT: Requires the usage of an additional tool to manage the passwords and remote assistance capabilities for the IT Support team. Affects users: may require users to use tools they are unfamiliar with. |
| Disable Link-Local Multicast Name Resolution (LLMNR) and Network Basic Input/Output System (NetBIOS) in local computer security settings or by group policy if they are not needed within an environment. Use host-based security software to block LLMNR/NetBIOS traffic. Enabling SMB Signing | LLMNR/NBT-NS Poisoning and Relay | 1 day of IT work | Affects IT: Some legacy software might not function properly due to usage of restricted protocols or due to usage of unsupported ways to authenticate and pass/save credentials. There may be additional work for the IT staff in view of such restrictions when users use the system. Affects users: may restrict usage of certain software that utilize restricted authentication protocols |
| Block SMB/WMI/DCOM/SSH protocols between systems. | Network Protocols | 1 week of IT work | Affects IT: Need to create firewall rules to block different ports from different VLAN's to block lateral movement used protocols. |

In some exemplary embodiments, the costs and reductions in usability may be provided in the mapping in numerical or quantitative manner, so as to enable the usage thereof in computing the value of the utility function. It is noted that costs and reduction in usability may be organization specific.

In some exemplary embodiments, mitigation actions to be performed may be automatically suggested. In some exemplary embodiments, the reasoning behind the suggestion may be provided to the user, using visualizations, such as by showing alternatives. In some cases, a mitigation action may be performed for all assets in the organization, for a specific asset, or the like. The suggestion may be to perform a set of one or more mitigation actions. In some exemplary embodiments, each set of one or more mitigation actions may be evaluated, by calculating the utility of applying the set of one or more mitigation actions. An optimal set may be determined and suggested. In some cases, the optimization may be performed so as to maximize the utility function while adhering the maximal allowed cost (e.g., available resources) and maximal acceptable reduction in usability.

In some exemplary embodiments, bridges in the graph of network lateral movements may be identified. In some exemplary embodiments, a bridge may be an edge in the graph that connects between two connected components. In some exemplary embodiments, a mitigation action that is configured to remove the bridge may be determined and suggested to the user. In some exemplary embodiments, mitigation actions that remove bridges may be considered first, prior to evaluating mitigation actions that relate to non-bridge edges, such as edges within cycles and within connected components.

One technical effect of utilizing the disclosed subject matter is obtaining a clear assessment of security risks to an organizational network from an attacker's ability to perform network lateral movements. Such assessment may indicate that a low-level asset, that is accordingly being protected using low-standards, is in fact a weak link and represents a potential breach point into the high-level payloads of the organization.

Another technical effect of utilizing the disclosed subject matter is to improve security of an organizational network. In some exemplary embodiments, the disclosed subject matter may be utilized to optimize security given limitations on adverse effects on usability and on overall resources available to perform mitigation actions. It is noted that the mitigation suggestions in accordance of the disclosed subject matter are immune to biases, as opposed to suggestions by domain experts. The suggestions do not favor simple mitigation actions that are easy to implement, nor do they necessarily focus on protecting a high value payload directly. The novel quantitative metrics employed by the disclosed subject matter enable to identify high-impact mitigation actions, avoid performing redundant mitigation actions that provide no positive affect on the security level of the network, and select an optimal set of suggestions.

The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1A showing a flowchart diagram of a method, in accordance with some exemplary embodiments of the disclosed subject matter.

On Step 100, the network may be analyzed to identify assets. In some exemplary embodiments, the network may be analyzed to identify assets, such as users, devices, or the like, are in the network. In some exemplary embodiments, the network may be analyzed automatically, such as by having agents crawl the network and identify all assets. In some exemplary embodiments, assets may comprise software assets, such as Windows™, Linux™, Mac™ Operating Systems, SQL Server, Exchange™ server, Office 365™ server, Antivirus software, or the like. Additionally or alternatively, assets may comprise hardware devices, such as network devices, switches, routers, firewalls, printers, servers, workstations, monitors, USB devices, Uninterruptable Power Supplies (UPSs), Scanners, Voice over IP (VoIP) phones, Point of Sales (PoSs), mobile device (e.g., Android™ phone, iPhone™, or the like), Plug and Play devices, Sensors, or the like. Additionally or alternatively, assets may comprise virtual assets, such as virtual machines, locations, or the like. Additionally or alternatively, the assets may be user assets, such administrator users, local users, Active Directory users, or the like. In some exemplary embodiments, connectivity between assets may also be identified, such as determining connections between devices, users that can operate on devices, or the like. Properties of assets may be determined. The properties may be properties useful to determine potential possible network lateral movements. As an example, in assets representing devices, the properties may include, for example, a list of opened ports. As another example, a server asset may have a list of services that are running thereon. The services may differ in different types of servers (e.g., Windows™-based services as opposed to Linux™ services). Additionally or alternatively, the properties may indicate whether protection mechanisms are utilized or not. As an example, SMB signing enabled property may indicate whether SMB signing is enabled to protect against SMB relay attacks.

On Step 110, static analysis of the network and assets may be performed. During the static analysis, potential network lateral movements may be identified. In some exemplary embodiments, for each asset in the assets identified on Step 100, it may be determined whether the asset is susceptible to methods that enable network lateral movement. Additionally or alternatively, the assets that are reachable to an attacker using such methods may be determined. In some exemplary embodiments, there may be a myriad of methods and techniques, such as but not limited to Pass the Hash (PtH) technique, Pass the Ticket (PtT) technique, a modification of a logon script, a Remote Desktop Protocol (RDP) attack, a Server Message Block (SMB) relay attack, or the like. In some exemplary embodiments, the static analysis may provide an over-approximation of the network lateral movement, including false positive lateral movements. In some exemplary embodiments, the approximation may comprise all lateral movements in the network, and there may be no false negative indications (e.g., possible network lateral movements that are not identified by the static analysis).

On Step 120, dynamic analysis may be performed to validate that network lateral movements identified on Step 110. In some exemplary embodiments, the dynamic analysis may comprise performing penetration testing, attempting to implement the methods to effectuate network lateral movement from one asset to another. In some exemplary embodiments, a subset of the potential network lateral movements identified by the static analysis may be validated. Additionally or alternatively, some lateral movements may be invalidated by the dynamic analysis. Such invalidated lateral movements may be false positive indications of the static analysis. In some exemplary embodiments, it is noted that during dynamic analysis the analysis involves more than the static structure of the network, configurations and the like. The dynamic analysis may comprise execution of processes in the network to attempt implementing attacks and methods to perform the network lateral movement. It is further noted that the disclosed subject matter reduces the amount of time and resources required for such dynamic analysis by providing an initial subset of all theoretical lateral movements based on the static analysis or a portion thereof. Additionally, or alternatively, some potential lateral movements may not be validated nor invalidated, and may be considered as having an "unknown" status. In some exemplary embodiments, lateral movements in "unknown" status may be processed as "validated" or as "invalidated" depending on rules and configurations. In some exemplary embodiments, an unknown lateral movement may be considered of a relative high risk and may therefore be handled as if it was validated, while another low-risk lateral movement may be handled as if it was invalidated. Additionally, or alternatively, using big data analysis of past processing it may be possible to estimate whether in similar circumstances such lateral movement was invalidated or validated, and to handle the unknown lateral movement accordingly.

On Step 130, a graph of network lateral movements may be generated. The graph may comprise nodes representing assets in the network. The graph may comprise directed edges from source nodes to target nodes, where an edge indicates that a network lateral movement can be implemented from the source node to the target node of the edge. In some exemplary embodiments, an edge corresponds to a validated network lateral movement from the asset represented by the source node to the asset represented by the target node.

In some exemplary embodiments, each node in the graph may be assigned a probability of penetration to the asset represented thereby (132). The probability may depend on the likelihood of an attack, protection measures employed with respect to the asset, or the like. The probability may be determined automatically based on rules and historical information of similar assets, such as datasets indicating attacks or datasets of manually provided estimated probabilities. In some exemplary embodiments, deep learning or machine learning may be employed to estimate the probability. Additionally or alternatively, a domain expert may be utilized to provide insight into the probability. Additionally, or alternatively, the probability may change over time. Additionally, or alternatively, the probability may depend on monitoring of a external resources, such as monitoring events in the dark web. As an example, if someone in the dark web invites an attack on the organization or specific resource and if such event is identified, the probability may be updated.

In some exemplary embodiments, payload utilities may be assigned to nodes (134). A payload utility of the asset represented by the node may indicate the value of the payload at the asset, the damage from exposure of the payload, the estimated damage from an attacker gaining access to the payload (e.g., in view of a probability of the attacker exploiting the payload), or the like. A domain expert may determine the payload utility of a node. Additionally or alternatively, the payload utility may be determined automatically based on rules or in view of similar payloads by the same organization, of similar organizations, or the like. In some exemplary embodiments, deep learning or machine learning may be employed to estimate the payload utility of an asset in an automated manner.

In some exemplary embodiments, an edge may be labeled to indicate a method for performing network lateral movement over the edge, e.g., from the source node to the target node. In some exemplary embodiments, each node may be labeled by a single label, and there may be multiple edges from the same source to the same target. Additionally or alternatively, each node may be labeled by a plurality of labels, representing all methods that can be employed in order to effectual the lateral jump over the edge.

The graph of Step 130 may be utilized for different purposes, in accordance with the disclosed subject matter.

On Step 140a, a visualization of the graph may be displayed. The visualization may be displayed to a user. The user may review the graph, explore its content, and assess security risk to the network. Additionally or alternatively, the user may manipulate the graph, may request simulation of effects of mitigation actions, or the like. In some exemplary embodiments, the user may remove edges or nodes to review how the security risk to the network may change if changes are implemented.

On Step 150a, a modified graph may be determined. The modified graph may be a modification of the graph of Step 130, if a mitigation action is implemented. The effects of the mitigation action may be, for example, removal of an edge or of a node. It is noted that some mitigation actions may be include decommissioning an asset that is vulnerable, replacing an asset by a different asset having similar properties and lower penetration probabilities, or the like. In some exemplary embodiments, the modified graph may be based on a modification indicated by the user, such as removal of an edge, removal of a node, or the like.

On Step 160a, the modified graph may be visualized and displayed. In some exemplary embodiments, the visualizations of Steps 140a, 160a may be presented in the same display, such as side-by-side, one above the other, or the like, so as to enable a user to review the differences therebetween.

In some exemplary embodiments, the visualization of the modified graph may present a mapping of possible network lateral movements after the mitigation action is applied. Additionally or alternatively, the mapping may be displayed with an indication regarding the differences from the original mapping. This may enable to user to quickly comprehend what is modified in view of the mitigation action. In some exemplary embodiments, all unaffected edges and nodes may be presented in a grayed-manner, and the affected edges and nodes may be presented in color. The color-coding may be an absolute color-coding (e.g., indicating probability of penetration, estimated loss from penetration, payload value, or the like). Additionally or alternatively, the color-coding may be a relative color coding, indicating the difference between the original state and the modified state. In some exemplary embodiments, a combination of visual indications may be used to provide both absolute and relative aspects.

In some exemplary embodiments, the display may comprise statistics on the utility of the mitigation action such as reduced connectivity due thereto, nodes that were changed from "red" to "green", such as nodes where penetration should be avoided and the risk thereof was sufficiently handled, or the like.

Figure 1B:
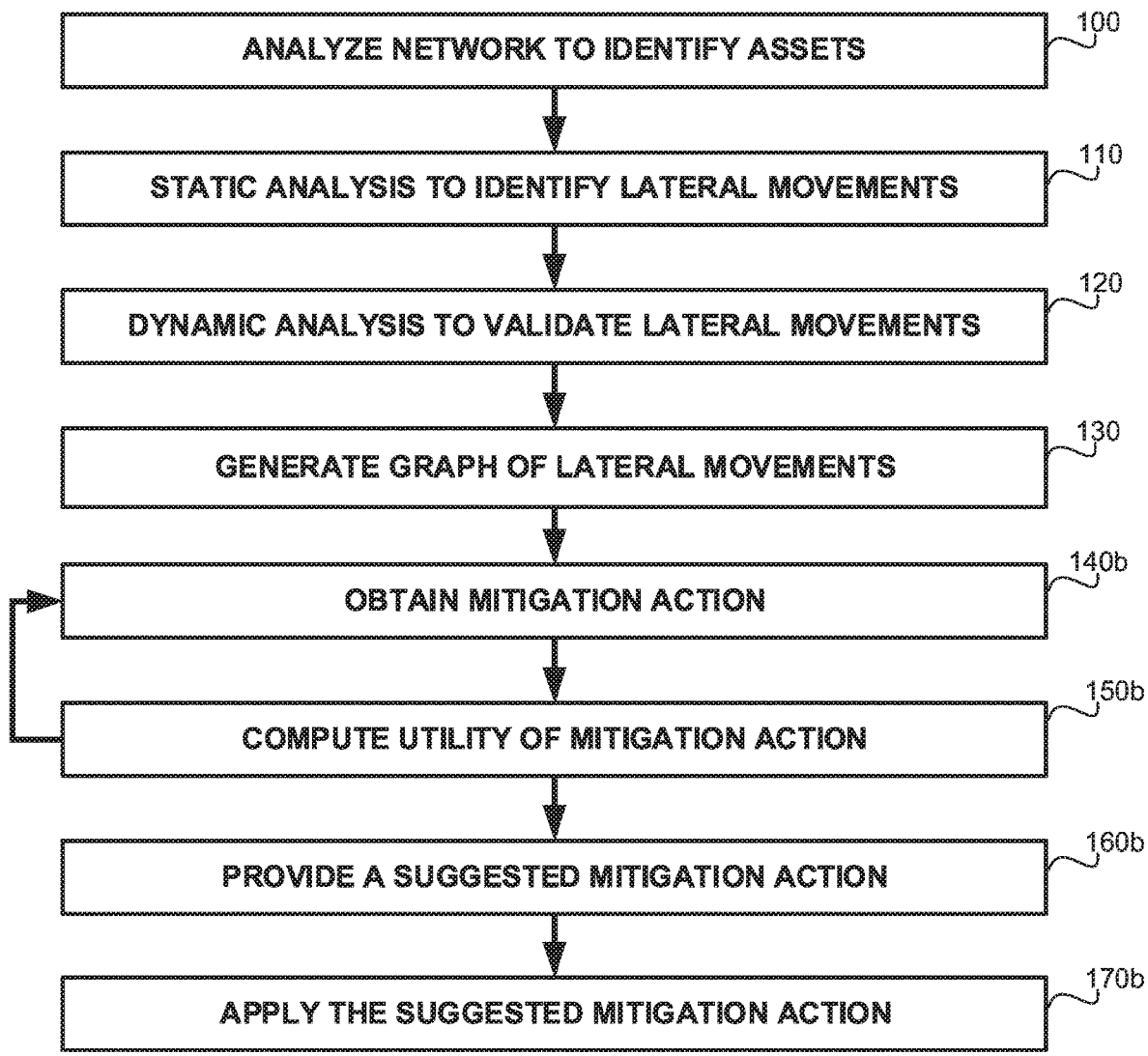

Referring now to FIG. 1B showing a flowchart diagram of a method, in accordance with some exemplary embodiments of the disclosed subject matter.

After the graph is generated (Step 130), mitigation actions may be evaluated. On Step 140a, a mitigation action may be obtained. The mitigation action may be obtained from a database of potential mitigation actions. In some exemplary embodiments, the database may comprise a mapping between mitigation actions and methods of performing network lateral movements. Mitigation actions that are relevant to the methods that can be employed to perform lateral jumps in the graph may be obtained. In some exemplary embodiments, the mitigation action being evaluated may be a set of mitigation actions, such as a same action applied on different assets, different mitigation actions applied on the same asset, different mitigation actions applied on different assets, or the like.

On Step 150b, a utility of the mitigation action may be computed. The utility may be computed, such as, using the utility function U(G,act). Additionally or alternatively, the utility may be computed based on a reduction in an estimated risk of penetration that can be computed based on the graph of network lateral movements. The estimated risk may be computed for the original graph and for a modified graph that represents application of the mitigation action. In some exemplary embodiments, the estimated risk of penetration may be computed as a summation of estimated risk of penetration to each node of the graph. The estimated risk of penetration to a node may be computed based on the probability of penetration directly to the node and based on payload utility of nodes, include the penetrated node, that are reachable from the node in the graph of network lateral movements. In some exemplary embodiments, the estimated risk of penetration may be computed as a summation of the probability of penetration to the node, multiplied by the probability of being able to reach a target node from the node (e.g., by performing one or more lateral movements), multiplied by the payload utility of the target node. It is noted that the summation may also refer to the payload utility of the node, for which the probability of being able to reach the node from the node may be considered as 100%. Additionally, or alternatively, the probability in such a case may be less than 100%, such as if the payload itself may be protected by another mechanism internally within the node, if the payload is obscure, or the like.

In some exemplary embodiments, the utility of the mitigation action may be computed using a function that is monotonically increasing with respect to reduction in the estimated loss from penetration. In some exemplary embodiments, given all other factors the same, if there is a reduction in the estimated loss, the utility function may provide at least the same utility value (or higher) as it provides without the given reduction. Generally, the larger the reduction in the estimated loss, the greater the increase in the utility.

In some exemplary embodiments, the utility of the mitigation action may be computed using a function that is monotonically decreasing with respect to an estimated cost of applying the mitigation action. In some exemplary embodiments, given all other factors the same, if there is a decrease in the estimated cost of applying the mitigation action, the utility function may provide at least the same utility value (or higher) as it provides without the given decrease in the estimated cost. Generally, the larger the decrease in the estimated cost of applying the mitigation action, the greater the increase in the utility.

In some exemplary embodiments, the utility of the mitigation action may be computed using a function that is monotonically decreasing with respect to a decrease in usability caused by the mitigation action. In some exemplary embodiments, given all other factors the same, if there is a decrease in usability caused by the mitigation action, the utility function may provide no more than the same utility value (or lower) as it provides without the given decrease in usability caused by the mitigation action. Generally, the larger the decrease in usability caused by the mitigation action, the greater the decrease in the utility.

In some exemplary embodiments, the utility function may be computed as $U(G,act)=RELP(G,act)-C(act)-RU(act)$. As can be appreciated, the function $U(G,act)$ is monotonically increasing in RELP, monotonically decreasing in C and monotonically decreasing in RU. Other functions the provide similar characteristics may be employed.

In some exemplary embodiments, Steps 140b-150b may be performed for a plurality of alternative mitigation actions, enabling to choose therebetween using the utility computed on Step 150b.

On Step 160b, a suggested mitigation may be provided to the user. The suggested mitigation may be a single mitigation action. Additionally or alternatively, the suggested mitigation may be a set of mitigation actions. In some exemplary embodiments, the suggestion may be provided to a user, such as an owner of the network, an administrator thereof, a security expert, or the like. The user may accept or reject the suggestion. In some exemplary embodiments, the user may modify the suggestion and implement the modified suggestion.

On Step 170b, the suggested mitigation action (or modification thereof) may be implemented. The users of the network may take part in the implementation of the mitigation action. In some exemplary embodiments, the mitigation action may be performed automatically, semi-automatically, or the like. In some exemplary embodiments, the mitigation action may require user cooperation, such as in replacing a password. An automated process may force the user to cooperate, such as by forcing the user to change her password.

In some embodiments, an optimization problem may be defined as follows:

$$\operatorname*{Max}_{act} \max U(G, \text{act}), \text{ subject to:}$$

$$\sum_{act} C(\text{act}) \leq MaxCost, \sum_{act} RU(\text{act}) \leq MaxRU.$$

MaxCost may MaxRU may represent a maximal acceptable cost of applying mitigations and reduced usability, respectively. The optimization problem may be automatically solved to identify a set of mitigation actions to be performed so as to maximize the utility therefrom on the one hand, and adhere to limitations on the inconvenience and costs of the mitigation actions.

Figure 1C:
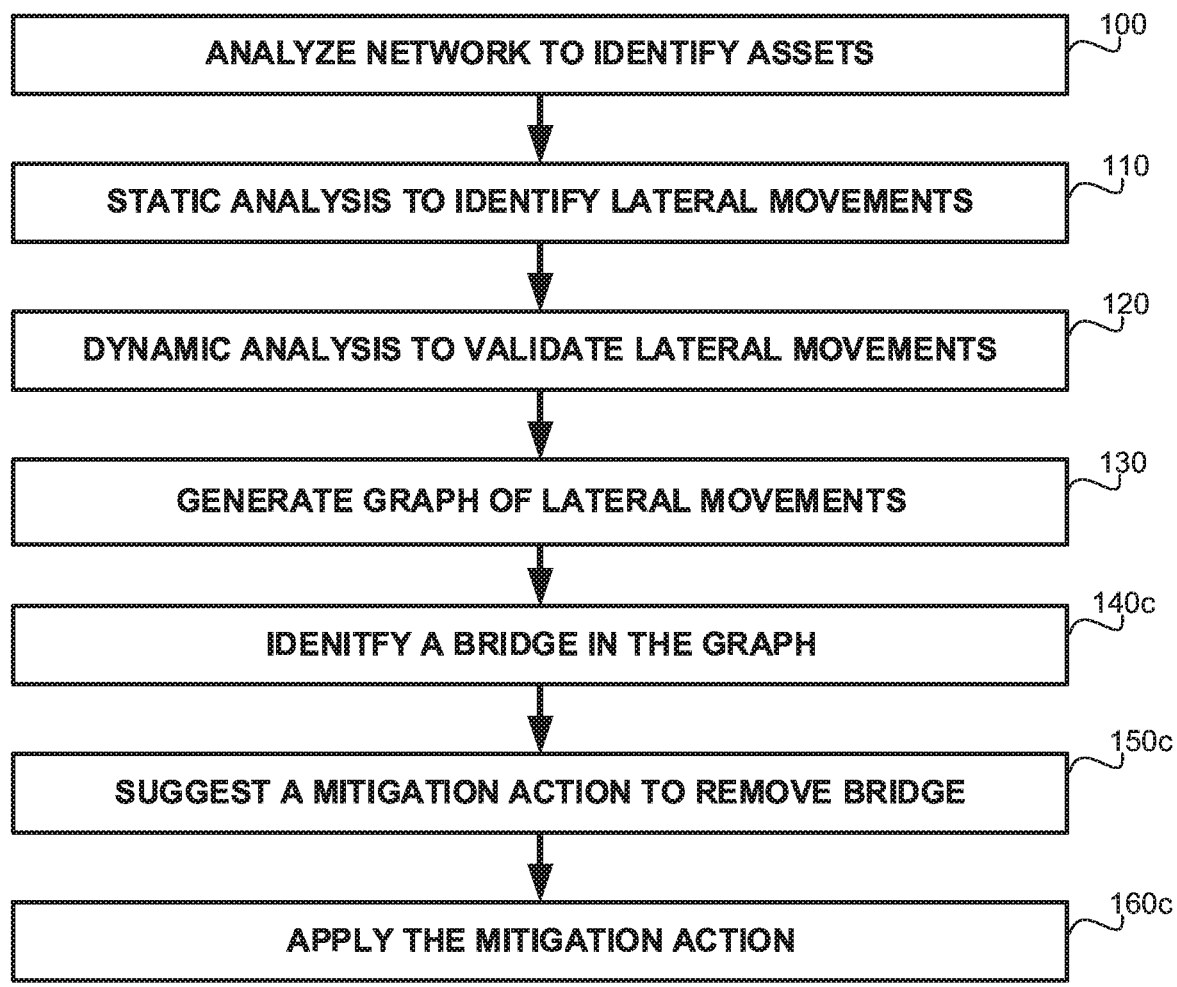

Referring now to FIG. 1C showing a flowchart diagram of a method, in accordance with some exemplary embodiments of the disclosed subject matter.

After the graph is generated (Step 130), a mitigation action may be suggested. On Step 140c, a bridge in the graph may be identified. The bridge may connect between connected components within the graph.

On Step 150c, a mitigation action that would remove the bridge may be suggested. In some exemplary embodiments, the suggestion may be of several mitigation actions that, together, remove the bridge, such as in case the bridge may be traversed using several different techniques, or if the bridge comprises multiple nodes that need to be handled (e.g., two users may need to improve their passwords). The user may accept, rejection or modify the suggestion. The mitigation action may be applied and implemented on Step 160c. Step 160c may be contingent on user approval of the suggestion or of a modification thereof.

FIGS. 2A-2C show illustrations of graph of network lateral movements, in accordance with some exemplary embodiments of the disclosed subject matter; and Graph 200 includes five nodes (Nodes 210, 220, 230, 240, 250) representing five assets. Network lateral movement from assets are represented by Edges 212, 214, 222, 232, 242. The edges are labeled with techniques that can be employed to perform the network lateral movement (A,B,C,D). Each node is annotated with a probability of being penetrated and with a payload value of the asset. For example, Node 210 has a 0.1 probability of being penetrated and a payload value of 1. Node 250 has a significant payload (100), and therefore it is well protected. In this example, Node 250 has 0 probability of being directly penetrated. However, Node 250 may be penetrated using network lateral movements from other nodes.

Estimated loss from penetration may be computed for Graph 200, using the function $ELP(G)=E_{V_n}ELP(G,n)$. $ELP(G,n)$ is the estimated loss from penetration to asset n, which may be computed as $ELP(G,n)=p(n)\cdot\Sigma_{m\in Reach(n)}pl(m)$. In this case:

$$ELP(200,210)=0.1\cdot(1+2+2+100)=10.5$$

$$ELP(200,220)=0.1\cdot(1+2+2+100)=10.5$$

$$ELP(200,230)=0.05\cdot(2+100)=5.1$$

$$ELP(200,240)=0.3\cdot(4+2+100)=31.8$$

$$ELP(200,250)=0$$

As a result, $ELP(200)=57.9$.

Mitigation actions may be implemented to prevent activation of methods A,B,C,D or any combination thereof. Preventing only method A may not have any impact on the ELP value as it does not remove any edge. Similarly, preventing only method B may also not have any impact. It is noted, however, that in some embodiments, the probability of successfully traversing an edge may be affected by the fact that some techniques are removed, and therefore in such embodiments, ELP may be affected even without the removal of an edge.

Graph 201 exemplifies a modified graph after a mitigation action that removes all possibility of performing techniques A and B, is implemented. Edges 222 and 242 are removed, and the ELP value is affected and reduced:

$$ELP(201,210)=0.1\cdot(1+2+2+100)=10.5$$

$$ELP(201,220)=0.1\cdot(2)=0.2$$

$$ELP(201,230)=0.05\cdot(2+100)=5.1$$

$$ELP(201,240)=0.3 \cdot (4)=1.2$$

$$ELP(201,250)=0$$

As a result, ELP(201)=17.

As can be appreciated a reduction in the ELP is gained based on the proposed mitigation action, and the security of the network is overall improved.

In some exemplary embodiments, an alternative mitigation action may relate solely to the D technique. Graph 202 exemplifies the modified graph of Graph 200 after such mitigation action is performed. As can be appreciated, Edge 232 is removed, disconnecting Node 250 from the remaining portion of Graph 202. As can be appreciated Edge 232 functioned as a bridge edge to the connected component that comprises Node 250. Removal of the bridge edge disconnects the connected component from the other nodes of Graph 202.

The ELP value is affected and reduced:

$$ELP(202,210)=0.1 \cdot (1+2+2)=0.5$$

$$ELP(202,220)=0.1 \cdot (1+2+2)=0.5$$

$$ELP(202,230)=0.05 \cdot (2)=0.1$$

$$ELP(201,240)=0.3 \cdot (4+2)=1.8$$

$$ELP(201,250)=0$$

As a result, ELP(202)=2.9.

As can be appreciated, the reduction in estimated loss from penetration is greater for the mitigation action exemplified by FIG. 2C than that achieved by the mitigation action exemplified by FIG. 2B. In some exemplary embodiments, the protection of the payload by the mitigation action exemplified by FIG. 2C is better than that exemplified by FIG. 2B.

Figure 3:
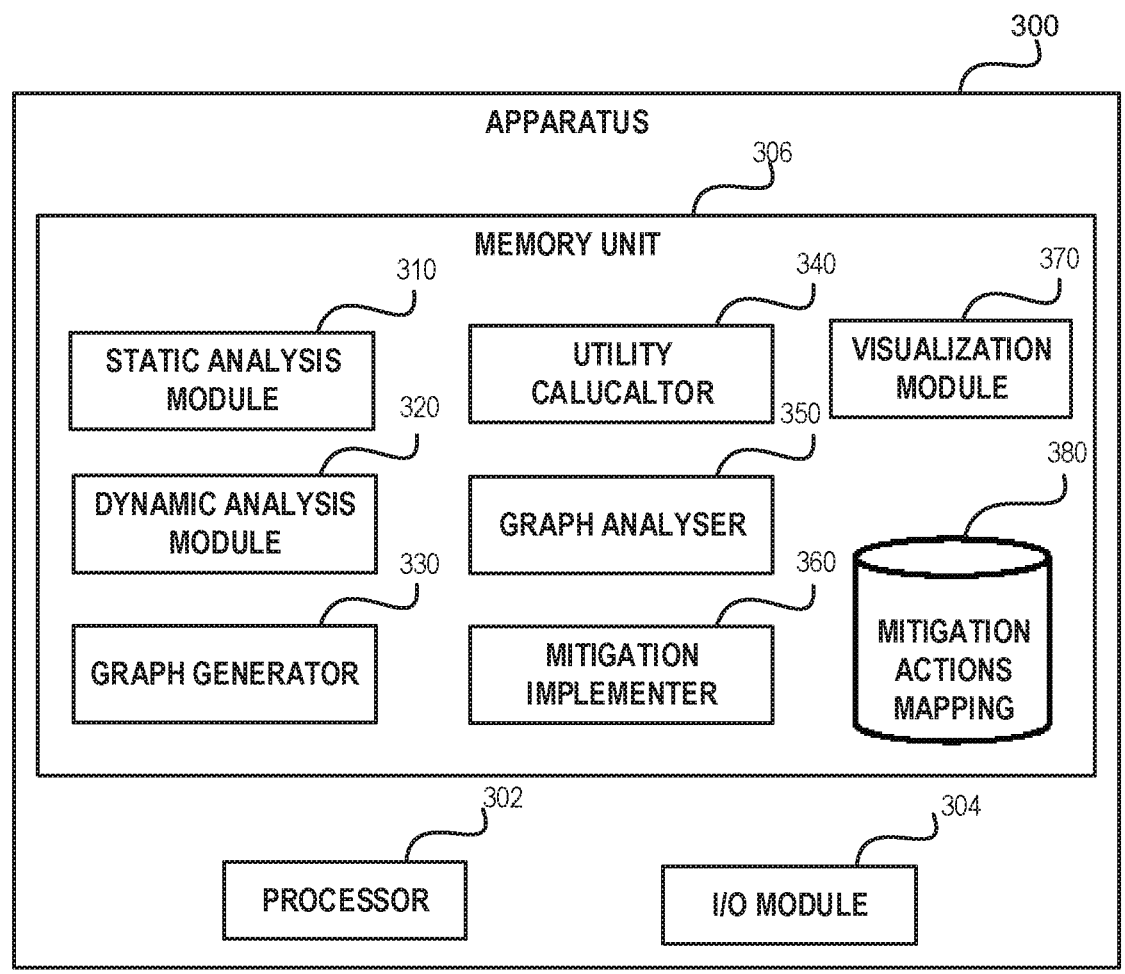
FIG. 3 shows a block diagram of an apparatus, in accordance with some exemplary embodiments of the disclosed subject matter.

In some exemplary embodiments, the reduction in estimated loss from penetration may represent one aspect of the utility from the mitigation action. Other aspects may be represented by the downsides of performing the mitigation action: associated costs of implementing the mitigation action and reduced usability in view thereof. Referring now to FIG. 3, showing an apparatus in accordance with some exemplary embodiments of the disclosed subject matter.

In some exemplary embodiments, Apparatus 300 may comprise one or more Processor(s) 302. Processor 302 may be a Central Processing Unit (CPU), a Graphical Processing Unit (GPU), a microprocessor, an electronic circuit, an Integrated Circuit (IC) or the like. Processor 302 may be utilized to perform computations required by Apparatus 300 or any of it subcomponents.

In some exemplary embodiments of the disclosed subject matter, Apparatus 300 may comprise an Input/Output (I/O) Module 304. I/O Module 304 may be utilized to provide an output to and receive input from a user, such as, for example displaying visualizations to users, receiving input from the user rejecting, accepting or modifying suggestions, obtaining rules, preferences or data from users, or the like.

In some exemplary embodiments, Apparatus 300 may comprise Memory Unit 306. Memory Unit 306 may be a hard disk drive, a Flash disk, a Random Access Memory (RAM), a memory chip, or the like. In some exemplary embodiments, Memory Unit 306 may retain program code operative to cause Processor 302 to perform acts associated with any of the subcomponents of Apparatus 300.

Memory Unit 306 may comprise one or more components as detailed below, implemented as executables, libraries, static libraries, functions, or any other executable components.

In some exemplary embodiments, Network Analyzer 310 may be configured to analyze a network to identify the list of assets. In some exemplary embodiments, Network Analyzer 310 may be configured to determine properties of the assets. In some exemplary embodiments, Network Analyzer 310 may analyze the network and assets in a static manner, in a dynamic manner, or the like.

In some exemplary embodiments, Static Analysis Module 320 may be configured to perform static analysis of a network. In some exemplary embodiments, the static analysis may be aimed at determining all network lateral movements between assets in the network, and may include some false positive indications regarding potential movements.

In some exemplary embodiments, Dynamic Analysis Module 330 may be configured to validate the potential network lateral movements determined by Static Analysis Module 320. Dynamic Analysis Module 330 may be configured to perform penetration testing to attempt to perform network lateral movements between assets.

In some exemplary embodiments, Graph Generator 340 may be configured to generate a graph of network lateral movements. In some exemplary embodiments, Graph Generator 340 may determine nodes and edges based on the assets and on validated network lateral movements. In some exemplary embodiments, Graph Generator 340 may assign properties to nodes, such as payload utilities, penetration probabilities, or the like. Additionally or alternatively, Graph Generator 340 may label nodes, such as by methods of applicable network lateral movements to traverse the edge, probability of successfully traversing the edge, or the like.

In some exemplary embodiments, Utility Calculator 350 may be configured to determine quantitative utility from performing a mitigation action. Utility Calculator 350 may compute a utility function based on reduction in the estimated loss from penetration in view of the mitigation action. Additionally or alternatively, the utility function may be computed based on the cost of applying the mitigation action and the reduction in usability due to the mitigation action. In some exemplary embodiments, cost of applying the mitigation action and reduction in usability may be obtained from a mapping, such as Mitigation Actions Mapping 390.

In some exemplary embodiments, Utility Calculator 350 may be utilized to compute the utility for performing a single mitigation action, a set of mitigation actions, or the like. In some exemplary embodiments, all potential combinations of mitigation actions that could be applied to affect any edge or node of the graph may be obtained, such as based on the Mitigation Actions Mapping 390. All potential combinations of such actions may be considered, and utilities thereof may be computed. Additionally or alternatively, linear programming or other methods may be employed to determine a set of mitigation actions that maximizes the utility function. Additionally or alternatively, the determined set of mitigation actions may also be subject to a limitation on the maximal cost of applying the mitigation actions, a limitation on the maximal reduction in usability, a limitation on the resources available for the determination of the set of mitigation action (e.g., looking for a local optimum that can be identified within a given timeframe for calculation), or the like.

In some exemplary embodiments, Graph Analyzer 360 may be configured to analyze the graph generated by Graph Generator 340. Graph Analyzer 360 may identify bridge edges, connected components, or the like. In some exemplary embodiments, mitigation actions that disconnect connected components, such as by removing a bridge edge, may be investigated and utility thereof may be computed using Utility Calculator 350.

In some exemplary embodiments, Mitigation Implementer 370 may be configured to implement one or more mitigation actions. The implementation of the mitigation actions may be performed in a fully automatic manner. Additionally or alternatively, some manual work may be required, and Mitigation Implementer 370 may orchestrate and monitor the tasks required to be performed by human users.

In some exemplary embodiments, Visualization Module 380 may be configured to provide a visualization of a graph. In some exemplary embodiments, the visualization may be implemented by a matrix listing assets, network lateral movements therefrom and their potential destination, and methods applicable to performing the network lateral movements. Additionally or alternatively, the visualization may be a graphical representation of the nodes and edges, using colors and other visual aids.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    obtaining a list of assets of a network;
    statically analyzing the network to determine for each asset of the list of assets, potential network lateral movements therefrom to other assets;
    dynamically analyzing the network to validate a subset of the potential network lateral movements, wherein said dynamically analyzing the network comprises performing penetration testing of the network, wherein said performing the penetration testing comprises attempting to exploit the potential network lateral movements identified by said statically analyzing the network, wherein the subset of the potential network lateral movements is validated based on successfully exploiting the subset of the potential network lateral movements during the dynamic analysis;
    generating, based on said dynamically analyzing, a graph of dynamically validated network lateral movements, the dynamically validated network lateral movements including the subset of the potential network lateral movements, wherein the graph is a directed graph that comprises a plurality of nodes and directed edges, wherein a node of the graph represents an asset of the list of assets, wherein a direct edge of the graph connecting a source node to a target node represents a dynamically validated network lateral movement from a source asset, represented by the source node, to a target asset, represented by the target node;
    displaying a first visualization of the graph of the dynamically validated network lateral movements;
    obtaining a mitigation action from a database of potential mitigation actions, wherein each of the potential mitigation actions is identified in the database as being associated with one or more methods of performing the dynamically validated network lateral movements, the mitigation action is configured, when implemented in the network, to prevent at least one method of the one or more methods of performing at least one dynamically validated network lateral movement;
    determining a modified graph, wherein the modified graph is determined based on a modification of the graph in case the mitigation action is implemented, wherein the modified graph removes at least one edge of the plurality of directed edges from the graph;
    displaying a second visualization based on the modified graph, wherein the second visualization includes a visual indication emphasizing differences between the modified graph and the graph; and
    in response to a user decision, implementing the mitigation action in the network.

2. The method of claim 1, wherein said generating comprises labeling the direct edge with at least two labels indicating at least two respective methods for performing a network lateral movement from the source asset to the target asset, wherein the graph is generated based on results of the penetration testing.

3. The method of claim 1, wherein said obtaining the list of assets comprises:
    analyzing the network to determine the list of assets in the network; and
    determining properties of assets in the network, wherein the properties comprise at least one of:
    a list of opened ports;
    a list of executed services; and
    an indication regarding utilization of one or more protection mechanisms.

4. The method of claim 1, wherein said statically analyzing comprises determining for each asset of the list of assets, whether the asset is susceptible to one or more methods enabling network lateral movements, wherein the one or more methods comprise at least one of:
    a Pass the Hash (PtH) technique; a Pass the Ticket (PtT) technique;
    a modification of a logon script;
    a Remote Desktop Protocol (RDP) attack; and
    a Server Message Block (SMB) relay attack.

5. The method of claim 1, wherein said generating comprises:
    assigning, for each node in the graph of the dynamically validated network lateral movements, a probability of penetration to an asset corresponding to the each node;
    assigning for each node in the graph of the dynamically validated network lateral movements, a payload utility representing utility from penetration to an asset corresponding to the each node; and
    labeling each edge in the graph of the dynamically validated network lateral movements with one or more labels indicating methods for performing network lateral movement from a source asset of the each edge to a target asset of the each edge.

6. The method of claim 1, further comprising:
computing a utility of the mitigation action, wherein the utility is computed based on a reduction in an estimated loss from penetration, wherein the estimated loss from penetration is computed based on the graph of the dynamically validated network lateral movements.

7. The method of claim 6, wherein the estimated loss from penetration is computed as a summation of estimated loss from penetration to each node of the graph, wherein an estimated loss from penetration to a given node is computed based on probability of penetration directly to the given node and based on payload utility of nodes that are reachable from the given node.

8. The method of claim 7, wherein the estimated loss from penetration to the given node is further computed based on a probability of successful network lateral movement from the given node to the nodes that are reachable from the given node.

9. The method of claim 6, wherein the utility is computed based on the reduction in the estimated loss from penetration, based on an estimated cost of applying the mitigation action, and based on a decrease in usability caused by the mitigation action; wherein the utility is a monotonically increasing function with respect to the reduction in the estimated loss from penetration; wherein the utility is a monotonically decreasing function with respect to the estimated cost of applying the mitigation action; and wherein the utility is a monotonically decreasing function with respect to the decrease in usability caused by the mitigation action.

10. The method of claim 1, further comprising:
identifying a bridge in the graph of the dynamically validated network lateral movements, wherein the bridge is an edge in the graph of the dynamically validated lateral movements that connects between two connected components in the graph of the dynamically validated lateral movements; and
providing a suggestion to perform the mitigation action based on a determination that the mitigation action is configured to remove the bridge from the graph of the dynamically validated network lateral movements, wherein in the modified graph, the two connected components are not connected.

11. The method of claim 1, wherein said implementing is performed by the user of the network, whereby the user prevents an ability to perform the at least one method of performing the at least one dynamically validated network lateral movement with respect to the at least one edge.

12. The method of claim 1, further comprises:
obtaining a second mitigation action from the database of potential mitigation actions, wherein the second mitigation action is different than the mitigation action, the second mitigation action is configured, when implemented in the network, to prevent at least a second method of performing a lateral movement;
determining a second modified graph, wherein the second modified graph is determined based on a modification of the graph in case the second mitigation action would be implemented, wherein the second modified graph removes at least one edge from the graph different that the at least one edge removed in the modified graph;
displaying a third visualization based on the second modified graph, wherein the third visualization includes a visual indication emphasizing differences between the second modified, the modified graph and the graph; and
wherein the user decision comprises selecting implementation of the mitigation action rather than the second mitigation action, whereby enabling a user of the network to select between different mitigation actions.

13. A non-transitory computer readable medium retaining program instructions, which program instructions when read by a processor, cause the processor to perform:
obtaining a list of assets of a network;
statically analyzing the network to determine for each asset of the list of assets, potential network lateral movements therefrom to other assets;
dynamically analyzing the network to validate a subset of the potential network lateral movements, wherein said dynamically analyzing the network comprises performing penetration testing of the network, wherein said performing the penetration testing comprises attempting to exploit the potential network lateral movements identified by said statically analyzing the network, wherein the subset of the potential network lateral movements is validated based on successfully exploiting the subset of the potential network lateral movements during the dynamic analysis;
generating, based on said dynamically analyzing, a graph of dynamically validated network lateral movements, the dynamically validated network lateral movements including the subset of the potential network lateral movements, wherein the graph is a directed graph that comprises nodes and directed edges, wherein a node of the graph represents an asset of the list of assets, wherein a direct edge of the graph connecting a source node to a target node represents a dynamically validated network lateral movement from a source asset, represented by the source node, to a target asset, represented by the target node;
displaying a first visualization of the graph of the dynamically validated network lateral movements;
obtaining a mitigation action from a database of potential mitigation actions, wherein each of the potential mitigation actions is identified in the database as being associated with one or more methods of performing the dynamically validated network lateral movements, the mitigation action is configured, when implemented in the network, to prevent at least one method of the one or more methods of performing at least one dynamically validated network lateral movement;
determining a modified graph, wherein the modified graph is determined based on a modification of the graph in case the mitigation action is implemented, wherein the modified graph removes at least one edge of the plurality of directed edges from the graph;
displaying a second visualization based on the modified graph, wherein the second visualization includes a visual indication emphasizing differences between the modified graph and the graph; and
in response to a user decision, implementing the mitigation action in the network.

14. The non-transitory computer readable medium of claim 13, wherein said generating comprising labeling the direct edge with at least two labels indicating at least two respective methods for performing a network lateral movement from the source asset to the target asset, wherein the graph is generated based on results of the penetration testing.

15. The non-transitory computer readable medium of claim 13, wherein said generating comprises:
assigning, for each node in the graph of the dynamically validated network lateral movements, a probability of penetration to an asset corresponding to the each node;

assigning for each node in the graph of the dynamically validated network lateral movements, a payload utility representing utility from penetration to an asset corresponding to the each node; and labeling each edge in the graph of the dynamically validated network lateral movements with one or more labels indicating methods for performing network lateral movement from a source asset of the each edge to a target asset of the each edge.

16. The non-transitory computer readable medium of claim 13, wherein the program instructions when read by the processor, further cause the processor to perform:

computing a utility of a mitigation action, wherein the utility is computed based on a reduction in an estimated loss from penetration, wherein the estimated loss from penetration is computed based on the graph of the dynamically validated network lateral movements.

17. The non-transitory computer readable medium of claim 16, wherein the utility is computed based on the reduction in the estimated loss from penetration, based on an estimated cost of applying the mitigation action, and based on a decrease in usability caused by the mitigation action;

wherein the utility is a monotonically increasing function with respect to the reduction in the estimated loss from penetration;

wherein the utility is a monotonically decreasing function with respect to the estimated cost of applying the mitigation action; and wherein the utility is a monotonically decreasing function with respect to the decrease in usability caused by the mitigation action.

18. The non-transitory computer readable medium of claim 13, wherein the program instructions when read by the processor, further cause the processor to performs:

identifying a bridge in the graph of the dynamically validated network lateral movements, wherein the bridge is an edge in the graph of the dynamically validated lateral movements that connects between two connected components in the graph of the dynamically validated lateral movements; and providing a suggestion to perform the mitigation action based on a determination that the mitigation action is configured to remove the bridge from the graph of the dynamically validated network lateral movements, wherein in the modified graph, the two connected components are not connected.

19. An apparatus comprising a processor and a memory unit, wherein said processor is configured to perform:

obtaining a list of assets of a network;

statically analyzing the network to determine for each asset of the list of assets, potential network lateral movements therefrom to other assets;

dynamically analyzing the network to validate a subset of the potential network lateral movements, wherein said dynamically analyzing the network comprises performing penetration testing of the network, wherein said performing the penetration testing comprises attempting to exploit the potential network lateral movements identified by said statically analyzing the network, wherein the subset of the potential network lateral movements is validated based on successfully exploiting the subset of the potential network lateral movements during the dynamic analysis;

generating, based on said dynamically analyzing, a graph of dynamically validated network lateral movements, the dynamically validated network lateral movements including the subset of the potential network lateral movements, wherein the graph is a directed graph that comprises nodes and directed edges, wherein a node of the graph represents an asset of the list of assets, wherein a direct edge of the graph connecting a source node to a target node represents a dynamically validated network lateral movement from a source asset, represented by the source node, to a target asset, represented by the target node;

displaying a first visualization of the graph of the dynamically validated network lateral movements;

obtaining a mitigation action from a database of potential mitigation actions, wherein each of the potential mitigation actions is identified in the database as being associated with one or more methods of performing the dynamically validated network lateral movements, the mitigation action is configured, when implemented in the network, to prevent at least one method of the one or more methods of performing at least one dynamically validated network lateral movement;

determining a modified graph, wherein the modified graph is determined based on a modification of the graph in case the mitigation action is implemented, wherein the modified graph removes at least one edge of the plurality of directed edges from the graph;

displaying a second visualization based on the modified graph, wherein the second visualization includes a visual indication emphasizing differences between the modified graph and the graph; and in response to a user decision, implementing the mitigation action in the network.

* * * * *